United States Patent [19]
Long et al.

[11] Patent Number: 6,054,402
[45] Date of Patent: Apr. 25, 2000

[54] MULLITE-ZIRCONIA ENGINE PART

[75] Inventors: Michael C. Long; Michael H. Haselkorn, both of Peoria; Virgil R. Hester, Delavan, all of Ill.

[73] Assignee: Caterpillar Inc., Peoria, Ill.

[21] Appl. No.: 08/617,967

[22] Filed: Mar. 13, 1996

Related U.S. Application Data

[63] Continuation of application No. 08/327,735, Oct. 24, 1994, abandoned, which is a continuation-in-part of application No. 08/278,590, Jul. 21, 1994, abandoned.

[51] Int. Cl.$^7$ .................................................. C04B 35/48
[52] U.S. Cl. ...................... 501/103; 501/105; 501/128; 252/62; 123/65 PE; 123/169 E; 123/169 P; 123/198 E
[58] Field of Search ...................... 501/103, 105, 501/128, 153, 12; 252/62; 428/34.4; 123/169 E, 169 P, 198 E, 65 PE, 65 P

[56] References Cited

U.S. PATENT DOCUMENTS 4,904,626  2/1990  Shaffer ..................................... 501/128

FOREIGN PATENT DOCUMENTS 3-215367  9/1991  Japan .
4-135655  5/1992  Japan .

OTHER PUBLICATIONS

"Roll for Heat Treatment Furnace", Kurisu et al. JP 05–247622, Nippon Steel Corp. (Jan. 6, 1994).

"Member for Grinder", Yamamoto et al., JP 04–135655, Chichibu Cement Co LTD. (Aug. 27, 1992).

"Production of Mullite–Zirconia Composite Ceramics", Shiga et al., JP 04–97942, Chichibu Cemet Co. LTD. (Jan. 21, 1992).

"Jig for High Temperature Burning", Goto et al. JP 03–215367, Kikusui Kagaku Kogyo KK (Dec. 11, 1991).

"Case for Calcining Fernte Core", Sakaguchi, JP 01–305853, Nippon Ferrite LTD. (Feb. 22, 1990).

"Production of Zirconia Reinforced Mullite Ceramics", Nakada et al. JP 01–20366, Nitachi Chem Co. LTD. (Nov. 17, 1989).

*Primary Examiner*—Paul Marcantoni
*Attorney, Agent, or Firm*—Frank L. Hart; Pankaj M. Khosla

[57] ABSTRACT

An improvement in a thermally insulating component for an engine part, made by sintering from ceramic materials, comprises, the thermally insulating component having a composition, consisting of a mixture of zirconium oxide in the range of about 5% to about 25% by volume and mullite in the range of about 75% to about 95% by volume. Further, the mixture of zirconium oxide and mullite is obtained by chemically mixing the zirconium oxide and mullite in their molecular states, rather than mechanically mixing them. Another feature of this invention includes, forming said thermally insulating component by slip casting and pressureless sintering the mixture of zirconium oxide and mullite at a temperature no greater than 1700° C. This improvement in a thermally insulating component for an engine part, made from a mullite-zirconia ceramic composite, embodying the present invention, is particularly useful in making flame decks for cylinder heads, and insulating coverings for pistons and exhaust ports.

8 Claims, No Drawings

MULLITE-ZIRCONIA ENGINE PART

This is a continuation of Ser. No. 08/327,735, filed Oct. 24, 1994, now abandoned, which is a continuation-in-part of Ser. No. 08/278,590 filed Jul. 21, 1994, now abandoned.

TECHNICAL FIELD

The present invention relates to a thermally insulating component for an engine part, made from a ceramic material, and more particularly to a thermally insulating component made by slip casting and pressureless sintering the ceramic material to yield a ceramic composite that exhibits substantially increased mechanical properties.

BACKGROUND ART

The essential requirements for a ceramic material to be used as a thermally insulating component of an engine part, are good mechanical and thermal properties. For a ceramic material to be used for high temperature applications, such as a combustion environment in an engine, it should have high toughness. Toughness is defined as an improved resistance to fracture. Fracture may occur due to either inherent flaws in the ceramic microstructure or due to flaws sustained in the use of the ceramic at high temperatures. Fracture may also occur because of different thermal coefficient of expansion of the ceramic component and the metallic engine part. A ceramic material should also possess low thermal conductivity to enhance its insulating properties.

It is known that mullite ($3Al_2O_3.2SiO_2$) is a good refractory material offering desirable properties at high temperatures such as low thermal expansion, low thermal conductivity, good hardness, good creep resistance, high melting point and good resistance to chemical attack. However, mullite, by itself, typically lacks the strength to be an engine component.

It is also known that zirconia ($ZrO_2$) is a very good refractory material. The problem with zirconia, when used by itself for a thermally insulating component of an engine part, is that it de-stabilizes from tetragonal phase to monoclinic phase, losing up to 25% of its strength, when exposed to engine operating temperatures, moisture and the by-products of combustion. Several inventors have attempted to toughen the zirconia matrix by the addition of fibers and whiskers. U.S. Pat. No. 4,804,643 issued Feb. 14, 1989 to Chyung et. al discloses the use of silicon carbide (SiC) whiskers to reinforce the zirconia matrix to achieve a 25% gain in fracture toughness. However, to achieve this gain, the whisker-toughened zirconia is sintered by hot-pressing at high pressures in the range of 5–10 Kpsi. Not only is this process cost prohibitive for making a large number of parts, but the presence of SiC whiskers enhances the thermal conductivity of the material, which is an undesirable property for a thermally insulating component.

U.S. Pat. No. 4,774,209 issued Sep. 27, 1988 to Gadkaree et. al discloses the use of a combination of silicon carbide whiskers and zirconia to reinforce the mullite matrix. Gadkaree et. al also disclose a process of combining zirconia and mullite which includes first compounding a dry batch of the appropriate oxides, $Al_2O_3$, $ZrO_2$ and $SiO_2$, and after the dry-mixing of these oxides, a liquid vehicle is added to form a slurry. It has been found in the present invention that the use of a ceramic material produced from such a process, for making an insulating component for an engine part, is not very beneficial because the material is susceptible to fracture due to inherent flaws in the grain microstructure as a result of the limitations inherent in mechanical dry-mixing of the oxides. Further, the presence of SiC whiskers is undesirable because they enhance the thermal conductivity of the thermally insulating component.

U.S. Pat. No. 4,657,877 issued Apr. 14, 1987 to Becher et. al discloses another mullite matrix with SiC whiskers and zirconia. This patent also discloses the dry-mixing of the mullite and zirconia particulates and SiC whiskers and subsequent sintering by hot-pressing. Further, Becher avoids the addition of a stabilizing aid such as yttria, primarily to avoid the reaction of SiC whiskers with cubic zirconium which would severely detract from the physical properties of the composite.

U.S. Pat. No. 4,519,359 issued on May 28, 1985 to Dworak et. al discloses a mullite matrix with zirconia or hafnia, and stabilizers such as magnesium oxide, calcium oxide, or yttrium oxide. Dworak further suggests that the production of the ceramic engine component is not tied to the use of a particular starting material. contrary to this suggestion, it has been found that for application in an engine combustion atmosphere, the performance of the mullite-zirconia matrix is tied to the starting raw materials and process by which the starting raw materials, i.e., mullite and $ZrO_2$, are mixed.

In the present invention, it has been found that if a mullite-zirconia matrix contains no sintering aids or stabilizers, and further if $ZrO_2$ and mullite are chemically mixed in a molecular state as described by H. Shiga et. al, in "Sol Gel Synthesis and Sintering of Oxide Doped Mullite-$ZrO_2$ Composite Powders", Ceramic Transactions, Vol. 22, 1991, rather than mechanically mixed in a powder form, the molecular level mixing of $ZrO_2$ and mullite yields a very fine (0.1–0.5 microns) grain size upon sintering and improves the transformation toughening of tetragonal zirconia. It has further been found that there is a synergism between the starting raw materials and the sintering process, i.e., a thermally insulating component made from a chemically mixed and stabilizer free, mullite-$ZrO_2$ mixture, can be slip-cast and pressureless sintered to yield a composite having a substantially net desired shape, and a significant enhancement in mechanical properties.

It is desirable to have a mullite-zirconia ceramic material that can be processed in a manner such that a grain size of less than 1 micron is attained. It is also desirable that a thermally insulating component for an engine part exposed to high temperature, high pressure, combustion gas environment in an engine, have a very low probability of failure. It is further desired that a thermally insulating ceramic component have high toughness and low thermal conductivity and be processed in a manner so that minimum machining of the component is required and high production rates can be achieved. The present invention is directed to overcome one or more of the problems as set forth above.

DISCLOSURE OF THE INVENTION

In one aspect of the invention, an improvement in a thermally insulating component for an engine part, made by sintering from ceramic materials, and which has openings therethrough, comprises, said thermally insulating component having a composition, consisting of a mixture of zirconium oxide in the range of about 5% to about 25% by volume and mullite in the range of about 75% to about 95% by volume. Further, the homogeneous mixture of zirconium oxide and mullite is obtained by chemically mixing the zirconium oxide and mullite in their molecular states, rather than mechanically mixing them. Further, the thermally insulating component is formed by slip casting and pressureless sintering the mixture at a temperature less than about 1700° C.

In another aspect of the invention, a process for forming a thermally insulating component for an engine part, made by sintering from ceramic materials, and which has openings therethrough, comprises the steps of, providing a slip comprising a solids mixture of zirconium oxide in the range of from about 5% to about 25% by volume and mullite in the range of from about 75% to about 95% by volume, a suspending vehicle, and a dispersant, adding sufficient acid to said slip and maintaining the pH of the slip at a value less than about 7, pouring the slip into a mold for forming the slip into a desired shape, drying the slip inside the mold for a period of time not less than about 1 week, and forming an article having a desired shape. After forming the shaped article, the process further comprises, removing article from the mold, densifying the article by pressureless sintering at a temperature no greater than about 1700° C. for a period no greater than about 3.5 hours, and forming said thermally insulating component.

BEST MODE FOR CARRYING OUT THE INVENTION

In the preferred embodiment of the present invention, the improvement in an engine part having a thermally insulating component, comprises, the thermally insulating component having a composition consisting of, a mixture of about 15% by volume zirconium oxide and about 85% by volume mullite, the mixture being a homogeneous dispersion of $ZrO_2$ in mullite, the mixture being obtained by chemically mixing mullite and $ZrO_2$ in their ionic state to achieve a molecular level mixing, and the thermally insulating component being formed by slip casting and pressureless sintering the mixture at a temperature not greater than 1700° C.

In the preferred embodiment of the present invention, the thermally insulating component has a thermal conductivity no greater than about 5.5 W/m.K, a coefficient of thermal expansion greater than about $4.5 \times 10^{-6}$ °$C^{-1}$, a Weibull modulus greater than about 10, and a density of at least 99% of theoretical density.

The amount of zirconium oxide should be no less than 5% and the amount of mullite should be no greater than 95% by volume, because the strength of the thermally insulating component will decrease. The amount of zirconium oxide should be no greater than 25%, and the amount of mullite should be no less than 75% by volume, because reduced levels of mullite will cause loss of transformation toughening, and the zirconia will tend to destabilize from tetragonal phase to monoclinic phase. The sintering temperature should not be greater than 1700° C., otherwise the zirconia-mullite matrix will start melting.

In the below described illustrative Examples A and B, samples 3–5 were sintered by hot pressing the ceramic composition powdered mixture, to result in a sintered ceramic composite. The hot pressing was done in the following manner: the ceramic powder for the desired composition of each sample was loaded into a graphite die. The powder was then pre-compressed at room temperature and the resultant pre-compressed part was then placed into a hot press. A partial vacuum of less than about 100 milliTorr was created in the cavity inside the hot press. The part was then heated to a temperature of about 1575° C. at a rate of about 5° C. per minute and maintained at about 1575° C. for about 3 hours. At a temperature of 900° C., a pressure of about 40 MPa was applied. The pressure was maintained at about 40 MPa up to a temperature of 1575° C. and for about 3 hours thereafter. The pressure was then released and the mold was allowed to cool down to room temperature.

Sample 1 is composed of magnesium oxide and zirconium oxide, which is a commercially available magnesium stabilized zirconia, having a trade name "Zircoa 5027", and is manufactured by Zircoa Inc. Sample 2 is composed of yttrium oxide and zirconium oxide, which is also a commercially available yttria stabilized zirconia, having a trade name "Zirconia-Yttria Partially Stabilized TZP", and is manufactured by Coors, Inc. Sample 3 is composed of a mixture of about 15% by volume zirconium oxide and about 85% by volume mullite, which is a commercially available dispersion of zirconia in mullite, having a trade name "MZ15", and is manufactured by Scimarec Co., Ltd. Furthermore, "MZ15" is a homogeneous dispersion of $ZrO_2$ in mullite, obtained by adopting the sol gel method. Samples 4 and 5, having trade names "MZ10" and "MZ05" and compositions of about 10% and about 5% by volume $ZrO_2$ in mullite respectively, are also manufactured by Scimarec Co., Ltd.

Briefly, the sol gel method is a commercially developed process involving nano-scale mixing of an alumina sol and a silica sol to result in single phase mullite with almost no secondary glassy phase. Then, a mullite sol is prepared and mixed with zirconia sol. The zirconia sol is prepared by using zirconyl chloride. The resultant mullite-zirconia sol is gelled, dried, ball mixed, calcined, and milled to form a homogeneous mullite-zirconia powder.

In the below described illustrative Examples A and B, samples 1 and 2 were formed and sintered by a contracting company by their proprietary means. Sample 6 was pressureless sintered after slip casting the ceramic composition powdered mixture to result in a sintered ceramic composite. This was done in the following manner: the ceramic powder mixture was combined with water in a 50:50 weight ratio. Then, nitric acid was added to adjust the pH, desirably, in the range of from about 3 to 5, to form a homogeneous dispersion of the ceramic powder in acidic water. It was observed that if the pH was greater than 7, the dispersion would tend to settle. Hence the pH, should preferably, be less than 7. The resultant slip was further mixed in a ball mill and the pH was checked again. A plaster mold for the component to be cast was made. The slip was poured into the plaster mold having the shape of the actual engine component. As the water was drawn out from the slip by the capillary action of the paster mold, the slip was compacted against the walls of the mold. The slip was then allowed to dry inside the mold, at room temperature, to prevent cracking, for a period of at least 1 week. The dried slip was then removed from the mold and pressureless sintered as per the following firing schedule: heat to a temperature of about 1200° C. at a rate of 5° C. per minute, then further heat to a temperature of about 1630° C. at a rate of 1° C. per minute, hold for about 3 hours at about 1630° C. and then allow to cool down to room temperature.

Alternatively, the mold may be made from a plastic material having a porous microstructure. The drying of the slip inside the mold should be no less than 1 week, otherwise, the slip may crack.

For all test samples in the below described illustrative Examples, the average breaking stress (B50 stress) was measured according to the Military Standard 1942a, which is a 4 point bend test on "B" sized bars having the dimensions, 3 mm×4 mm×45 mm.

For all test samples in the below described illustrative Examples, the Weibull modulus (m) was calculated from the breaking stress measurements in the following manner: the probability of failure (P) was calculated from the B50 stress data. A graph was plotted, with $\text{Log}[\text{Log}\{1/(1-P)\}]$ on the y-axis and Log[B50 stress] on the x-axis. The slope of the resulting line was calculated. Weibull modulus, m, is the slope of the resulting line. Weibull modulus reflects the degree of variability in strength of the material. The higher the Weibull modulus, the less variable is the strength. Values in the range of about 5 to 20 are common for most ceramic materials. Hence, calculation of the Weibull modulus for a specific material and test conditions, enables predictions to be made about survival probabilities at particular stress levels.

In the preferred embodiment of the present invention, the Weibull Modulus is desirably at least 10, and preferably, in the range of about 10 to about 20.

EXAMPLE A

The properties of samples 1–3 were tested at a room temperature of about 20° C., both before and after subjecting to a diesel exhaust atmosphere. The diesel exhaust atmosphere test was conducted in the following manner: the samples were exposed to exhaust gases comprising the by-products of a typical diesel exhaust. The temperature of these exhaust gases was about 650° C. and the period of exposure of the samples to the diesel exhaust was about 1000 hours.

|  | Before | After | % loss |
|---|---|---|---|
| Sample 1 | | | |
| No. specimens tested | 29 | 29 | — |
| B50 Stress, MPa | 381 | 267 | 30% |
| B50 Strain, | 2.16 | 1.81 | 16% |
| Elastic Modulus, GPa | 178 | 49 | 16% |
| Weibull Modulus (m) | 15 | 13.9 | 6% |
| Sample 2 | | | |
| No. specimens tested | 20 | 15 | — |
| B50 Stress, MPa | 838 | 643 | 23% |
| B50 Strain, | 3.73 | 3.15 | 16% |
| Elastic Modulus, GPa | 228 | 207 | 9% |
| Weibull Modulus, (m) | 6.7 | 5.6 | 15% |
| Sample 3 | | | |
| No. specimens tested | 51 | 20 | — |
| B50 Stress, MPa | 459 | 452 | 1.5% |
| B50 Strain, | 2.22 | 2.29 | 0% |
| Elastic Modulus, GPa | 207 | 197 | 5% |
| Weibull Modulus, (m) | 8.86 | 11.89 | 0% |

The coefficient of thermal expansion of sample 3 was measured to be $5.5 \times 10^{-6}$ $C^{-1}$. The thermal conductivity of sample 3 was measured to be 4.8 W/m-°K. The specific heat of sample 3 was measured to be 900 J/kg-°K.

The coefficient of thermal expansion was measured by using a Theta Dual Pushrod Recording Dilatometer, at a temperature ranging from room temperature to about 1000° C. The thermal conductivity was calculated from the thermal diffusivity measurements made on a Holometrix Laser Flash Diffusivity device and the specific heat values measured by using a Differential Scanning Calorimeter (DSC), by using the formula:

$K = \alpha \cdot C_p \cdot \rho$ where; K is the thermal conductivity, $\alpha$ is the thermal diffusivity, $C_p$ is the specific heat, and $\rho$ is the density. The above mentioned methods for determining the coefficient of thermal expansion and thermal conductivity are typical of methods that would be employed by those skilled in the art.

As it can be seen, sample 3, a mullite-zirconia mixture which did not have any sintering aids such as magnesia or yttria, had better retention of mechanical properties after exposure to a diesel exhaust atmosphere, than samples 1 or 2, both of which were mixtures of zirconia with sintering aids. For sample 3, properties such as the breaking stress and strain and elastic modulus, were essentially unchanged before and after the test.

EXAMPLE B

The mechanical properties of samples 3–6 were tested at a room temperature of about 20° C. Samples 3, 4 and 5 are all commercially available powder dispersions of $ZrO_2$ in mullite, manufactured by Scimarec Co., Ltd. Sample 3, having a trade name "MZ15", is a mixture of about 15% by volume $ZrO_2$ and about 85% by volume mullite. Sample 4, having a trade name "MZ10", has about 10% by volume $ZrO_2$, and sample 5, having a trade name "MZ05", has about 5% by volume $ZrO_2$ in mullite.

Sample 6 was made by mixing "MZ10" and "MZ05" in a 46:54 weight ratio, to result in a mixture having about 7.5% by volume $ZrO_2$ and about 92.5% by volume mullite.

Samples 3, 4 and 5 were sintered by hot pressing (HP) and sample 6 was sintered by slip cast pressureless sintering (SCPL).

| | Sample #'s | | | |
|---|---|---|---|---|
| | 3 | 4 | 5 | 6 |
| % vol zirconia | 15% | 10% | 5% | 7.5% |
| Sintering Process | HP | HP | HP | SCPL |
| No. specimens tested | 51 | 14 | 13 | 22 |
| B50 Stress, MPa | 459 | 299 | 240 | 406 |
| B50 Strain, | 2.22 | 1.55 | 1.23 | 2.12 |
| Elastic Modulus, GPa | 207 | 193 | 195 | 192 |
| Weibull Modulus, (m) | 8.86 | 7.49 | 8.18 | 11.25 |

It was expected that the mechanical properties of sample 6 would be somewhat in-between the mechanical properties exhibited by samples 4 and 5. Thus, it was expected that regardless of the sintering process, sample 6 would exhibit a B50 stress of about 270 MPa and a B50 strain of about 1.39. Further, it was expected that the Weibull modulus of sample 6 would remain the same as that for samples 4 and 5, i.e., in the range of about 7.5 to 8.5.

Very surprisingly, and contrary to expectations, sample 6 exhibited remarkable improvements in B50 stress, B50 strain and Weibull modulus. Specifically, the B50 stress was 406 MPa (an improvement of 50% over expectations), the B50 strain was 2.12 (an improvement of 53% over expectations), and the Weibull modulus was 11.25 (an improvement of about 40% over expectations).

Further, the trend exhibited by samples 3–5, indicates that as the zirconia content in the mullite-zirconia matrix increases to 15% by volume, the B50 stress and the B50 strain also increases. It is thus expected that a mixture of 15% $ZrO_2$ and 85% mullite, by volume, when sintered by slip-cast and pressureless sintering, would yield a B50 stress that would be greater than or at least equal to, the B50 stress of a mixture of 7.5% $ZrO_2$ and 92.5% mullite, by volume, when also sintered by slip-cast and pressureless sintering. This is a significant improvement over the existing ceramic materials used for thermally insulating components for engine parts.

The density of the ceramic composite of sample 3 was measured to be 3.61 gms/cc, which was about 99.7% of the theoretical density of 3.62 gms/cc. It is expected that sample 6 also has greater than 99% of the theoretical density, based upon the physical property data.

Samples 4 and 6 were examined by using a Scanning Electron Microscope (SEM). Upon comparison, it was observed that both samples had a similar grain structure. The grain size was measured to be in the range of from about 0.1 to about 0.8 microns. Further analysis of both samples 4 and 6 by X-ray diffraction indicated that about 50% to 70% of zirconia present in the matrix, is in the tetragonal phase.

A synergism between using oxide-free mullite-$ZrO_2$ mixtures made by molecular level mixing, and slip cast-pressureless sintering has been discovered. As noted previously, it is known that tetragonal zirconia may be dispersed in a mullite matrix, to form a toughened composite by a process known as transformation toughening. Basically, upon firing the composite at temperatures above 1500° C., the ceramic densifies and zirconia is in its tetragonal form, which is stable at the firing temperature. Upon cooling, zirconia tries to transform from the tetragonal form to the monoclinic form, which is accompanied by about a 6% volume increase. But the mullite matrix restricts zirconia and keeps it in its tetragonal form, which is metastable at room temperature. Thus, in effect, the entire matrix is in a compressed state and any fatigue cracks formed in the matrix, trigger the transformation of the tetragonal form into monoclinic form, leading to further compressive stresses, which tend to seal off the crack. Hence, when cooled to temperatures below about 1000° C., this transformation toughening is especially effective.

It is known that addition of a sintering aid such as magnesium oxide or yttrium oxide, which is primarily added to form a solid solution with zirconia, acts as a stabilizer, and lowers the sintering temperature. Thus it is suggested that if sintering is done by the process of hot pressing, the addition of small amounts (about 1.0 to 2.0 wt %) of sintering agents, especially MgO, will act as stabilizers, increasing the tetragonal —$ZrO_2$ content and result in improved room-temperature mechanical properties of the mullite-zirconia composite, when compared with composites having no sintering agents. However, these sintering aids form glassy phases at grain boundaries which limit high temperature mechanical properties. Such limitation can be, for example, those conditions experienced during engine operation.

However, in contrast to these suggestions, as shown in Example A, it has been discovered that even if a mullite-$ZrO_2$ mixture is sintered by hot pressing, without using any magnesium oxide, yttrium oxide or another sintering aid, the resulting mullite-zirconia composite exhibits very good retention of mechanical properties. For example, a flame deck, comprising a circular plate with holes for valve seats machined therein, was made for an engine cylinder head, using an above described composition for sample 3. The flame deck was made by hot pressing in a manner described above. Then, as in Example A, it was subjected to a diesel engine exhaust atmosphere for about 1000 hrs at about 650° C. Even after a 1000 hours the ceramic engine component substantially retained its B50 stress and strain.

In summary, a synergism between (a) using mullite-$ZrO_2$ mixtures made by chemical mixing and essentially free of any sintering aids, and (b) slip cast and pressureless sintering of such a ceramic composition, has been discovered. It has been shown that surprisingly, pressureless sintering of the above described mullite-$ZrO_2$ powder without a sintering aid results in a ceramic composite that has about 50% higher B50 stress and strain. It has been further shown that the resultant ceramic composite of sample 6 has a higher Weibull modulus, and therefore more consistent mechanical properties and a lower probability of failure.

Industrial Applicability

An improvement in a thermally insulating component for an engine part, made from a mullite-zirconia ceramic composite, embodying the present invention, is particularly useful in making flame decks for cylinder heads, and insulating coverings for pistons and exhaust ports. This invention is useful in creating a component which will not require separate manufacture and assembly of valve seats, fuel injector and spark plug inserts because these openings can be machined directly into the ceramic component. This is possible because the thermally insulating component embodying the present invention has excellent mechanical strength for resisting mechanically and thermally induced stresses, and remarkable retention of these properties, even after prolonged exposure to combustion environment Further, the thermally insulating component described herein, is economical to produce because it can be slip cast in large numbers, before being pressureless sintered in one operation. Further, the thermally insulating component embodying the present invention will significantly reduce the machining cost because it can be fabricated to near net desired dimensions prior to machining.

Other aspects, features and advantages of the present invention can be attained from a study of this disclosure together with the appended claims.

We claim:

1. A component for an engine part, consisting of:

a thermally insulating component, said thermally insulating component formed from a composition, consisting of a mixture of zirconium oxide in the range of from about 5% to about 25% by volume and mullite in the range of from about 75% to about 95% by volume, and said composition being free of any sintering aids;

said mixture being a homogeneous dispersion of zirconium oxide in mullite, obtained by chemically mixing mullite and $ZrO_2$ by a sol gel porcess;

said thermally insulating component being formed by slip casting and pressureless sintering said mixture at a temperature less than about 1700° C.; and said thermally insulating component having a Weibull Modulus of at least 11.25, a B50 Stress of at least about 406 Mpa, and a density of at least 99% of theoretical density.

2. A engine part, as set forth in claim 1, wherein said thermally insulating component adheres to and covers said engine part.

3. A engine part, as set forth in claim 1, wherein said thermally insulating component is a planar plate comprising a plurality of valve seats machined therein.

4. A engine part, as set forth in claim 3, wherein said thermally insulating component is a planar plate comprising a spark plug opening machined therein.

5. A engine part, as set forth in claim 3, wherein said thermally insulating component is a planar plate comprising a fuel injector opening machined therein.

6. A engine part, as set forth in claim 3, wherein said thermally insulating component is an exhaust port opening.

7. A engine part, as set forth in claim 1, wherein said thermally insulating component is formed from a composition, consisting of:
   a mixture of zirconium oxide in the range of from about 10% to about 20% by volume and mullite in the range of from about 80% to about 90% by volume.

8. A engine part, as set forth in claim 1, wherein said thermally insulating component is formed from a composition, consisting of:
   a mixture of about 15% by volume zirconium oxide and about 85% by volume mullite; said thermally insulating component further having
   a thermal conductivity less than about 5.5 W/m.° K;
   a coefficient of thermal expansion greater than $4.5 \times 10^{-6°}$ $C^{-1}$;
   a Weibull modulus greater than 10; and
   a density of at least 99% of theoretical density.

* * * * *